United States Patent [19]

Satterfield et al.

[11] Patent Number: 5,764,883
[45] Date of Patent: Jun. 9, 1998

[54] SYSTEM AND METHOD FOR CHECKING FOR DYNAMIC RESOURCE MISUSE IN A COMPUTER PROGRAM

[75] Inventors: Wade J. Satterfield, Fort Collins; Samuel C. Sands, Loveland, both of Colo.

[73] Assignee: Hewlett-Packard Co., Palo Alto, Calif.

[21] Appl. No.: 623,353

[22] Filed: Mar. 28, 1996

[51] Int. Cl.[6] .................................................. G06F 11/00
[52] U.S. Cl. ........................................................ 395/183.14
[58] Field of Search ......................... 395/183.14, 183.09, 395/184.01, 185.03; 364/267.91, 269.4, 264

[56] References Cited

U.S. PATENT DOCUMENTS

| | | | |
|---|---|---|---|
| 4,720,778 | 1/1988 | Hall et al. ............................... | 364/200 |
| 5,390,325 | 2/1995 | Miller ....................................... | 395/575 |
| 5,394,347 | 2/1995 | Kita et al. ................................ | 364/578 |
| 5,490,249 | 2/1996 | Miller ....................................... | 395/183.14 |
| 5,513,122 | 4/1996 | Cheng et al. ............................ | 364/489 |
| 5,600,789 | 2/1997 | Parker et al. ........................... | 395/183.14 |

*Primary Examiner*—Robert W. Beausoilel, Jr.
*Assistant Examiner*—Stephen C. Elmore

[57] ABSTRACT

A system and method for identifying dynamic resource misuses via inspection that may result in problems like corrupted heap memory and memory leaks in a target program. The parameters and variable are marked with a particular state type. The target program is then analyzed one function at a time via symbolic execution so as to interpret each function based on the states of the variable and parameters and the operations performed by the basic blocks comprising the function. A state transition table is utilized to define the new state of a destination based on the operation and current state. Coding violations identified by the state transition table are reported and a signature of the function created for use when analyzing other functions that call the current function being analyzed.

21 Claims, 9 Drawing Sheets

STATE TRANSITION TABLE FOR INTERPRETING INTERMEDIATE CODE

| OPERATION / STATE | ASSIGN | ALLOCATE | DE-ALLOCATE | COPY | DEREF-ERENCE | TEST LOSE SCOPE | READ |
|---|---|---|---|---|---|---|---|
| UNKNOWN | CONSTANT | DYNAMIC | UN-INITIALIZED | UNKNOWN (SET READ FLAG, DEST. IS A DUPLICATE) | UNKNOWN (SET READ FLAG, DEST. IS AN INTERIOR) | OK | Set Read Flag |
| CONSTANT | CONSTANT | DYNAMIC | ERROR | CONSTANT (DEST. IS A CONSTANT) | CONSTANT (DEST. IS A CONSTANT) | OK | OK |
| DYNAMIC | CONSTANT (ERROR IF NO DUPLICATE) | DYNAMIC (ERROR if no DUPLICATE) | UN-INITIALIZED | DYNAMIC (DEST. IS A DUPLICATE) | DYNAMIC (DEST. IS AN INTERIOR) | ERROR if no DUPLI-CATE | OK |
| UN-INITIALIZED | CONSTANT | DYNAMIC | ERROR | UN-INITIALIZED (DEST. IS AN UN-INITIALIZED) | ERROR | OK | ERROR |
| DUPLICATE | CONSTANT | DYNAMIC | UN-INITIALIZED | DUPLICATE (DEST. IS DUPLICATE OF ORIGINAL) | DUPLICATE (DEST. IS AN INTERIOR) | OK | OK |
| INTERIOR | CONSTANT | DYNAMIC | ERROR | INTERIOR (DEST. IS AN INTERIOR) | INTERIOR (DEST. IS AN INTERIOR) | OK | OK |

FIG. 9

SYSTEM AND METHOD FOR CHECKING FOR DYNAMIC RESOURCE MISUSE IN A COMPUTER PROGRAM

FIELD OF THE INVENTION

This invention generally relates to the detection of coding violations in a computer program, and more particularly, to a resource misuse analysis system and method for finding dynamic memory problems and other resource problems in a computer program.

BACKGROUND OF THE INVENTION

When computer programs run on a computer system, they virtually always appropriate various system resources for their operation. Such resources may include, for example, dynamic memory, files, windows, fonts, or peripheral devices. However, problems occur when programs misuse these resources, often times resulting in system errors such as heap memory corruption, memory leaks, or file descriptor leaks, all of which may cause the program to exit prematurely.

As an example, all non-trivial programs require a certain amount of memory when running for storing data that is either to be processed or has been processed. Because programmers often do not know how much memory will be required by the program during any one execution, the programmer will typically call a library routine or function for requesting a certain number of bytes of memory for storage and then a second library routine or function for freeing the requested memory. In the C programming language, dynamic memory allocation is provided for by the function malloc( ) which allocates a block of memory at run-time in response to a request, and the function free( ) which frees the memory allocated by malloc( ) so that it can be re-used. With reference to FIG. 1, a typical memory configuration is illustrated including a static or compile-time (or static) part where the code (or text) of a program and the permanent variables associated with the program are stored, and a run-time (or dynamic) part where the temporary (or stack) variables associated with the program and a heap part are stored. For purposes of the present disclosure, the heap is the area of the memory used for dynamic memory allocation where blocks of memory are allocated and freed in an arbitrary order in a pattern that is not known until run-time. In addition, the run-time part includes an undefined block of memory into which the heap can grow into if necessary. Thus, by judiciously using malloc( ) and free( ) to allocate and de-allocated (i.e., free) memory blocks in the heap, a program is able to process large amounts of data without exhausting the available physical (or virtual) memory. However, several common problems, along with numerous other exotic problems, may occur in connection with the improper use malloc( ) and free( ) which may result in system errors. For instance, a pointer may not be initialized before it is used causing the program to produce wrong results or exit. This problem is sometimes caught by the compiler, but not with great efficiency. Another common problem is forgetting about a pointer that has been initialized with malloc( ). In this case, the memory is essentially lost, resulting in a memory leak. Memory leaks are errors in a program's dynamic memory allocation logic that cause the program to eventually exit due to memory exhaustion because the allocated memory was not freed. A particular concern here, especially with the advent of virtual memory, is that memory leaks, will not produce an error for some time making it difficult to draw a causal link between the memory leak and the resulting system error. Yet another common problem is when memory is allocated with malloc( ) and freed twice with free( ). In this case, once the memory has been freed once, another malloc( ) may be called to allocate all or part of that particular memory block which is then subsequently freed by the second free( ), corrupting the data placed there after the second malloc( ). Yet another common problem results from the use of memory that has already been freed with free( ). In this case, the program is using memory that is marked as free( ) and which can be allocated at any time by another malloc( ) which would corrupt the data therein.

Several system tools have been proposed in the prior art to detect the aforementioned resource misuses by computer programs. For example, a product sold under the trademark PURIFY® by Pure Software Inc. California, U.S.A., is a well known system tool which operates at run-time to check for dynamic memory abuses. However, resource tools such as PURIFY® operate at run-time, and thus, require the program to link and run in order to test its code. Further, only the portion of the code that is actually executed by the test data gets checked. Thus, if simple bench tests are being run, usually no more than 50% of the code gets checked. To perform more thorough testing requires that the test suites be developed before the debugging of the code is complete. This is undesirable because it is more efficient and easier for a programmer to fix code while it is being developed rather than once all the code is finished which is typically weeks to months later when the details of the code are no longer fresh on the programmer's mind. Even further, tools like PURIFY® are platform dependent in that they are only capable of checking for coding violations that cause problems on the particular platform that they are running at the time of testing. Thus, if a program checks out all right with PURIFY® but the computer upon which it is operating is then changed, then the program may not operate correctly. Moreover, tools like PURIFY® are typically limited to checking for one type of resource misuse, such as dynamic memory in the case of PURIFY®.

Although the foregoing approach has some merit in detecting dynamic resource abuse, the prior art is still not optimum. They do not provide for fast, comprehensive testing of all the code comprising the program before run-time, as would be desirable in software engineering. The prior art is detrimentally limited to merely checking code at runtime, and to only checking the paths through the code that are actually executed.

Thus, a heretofore unaddressed need exist in the industry for a system and method that comprehensively checks for dynamic resource abuses in a program in a timely manner and prior to run-time.

SUMMARY OF THE INVENTION

The present invention overcomes the inadequacies and deficiencies of the prior art as discussed hereinbefore and is well known in the industry. The present invention provides for a resource misuse analyzer that can be employed on a computer system for performing resource misuse analysis. The resource misuse analyzer of the present invention has practical application as an efficient tool for checking a target program for dynamic resource misuses via inspection rather than with bench testing at run-time. Consequently, the resource misuse analyzer can check all the code comprising the target program for any coding violations that may result in an error from a dynamic resource misuse. In essence, the resource misuse analyzer of the present invention checks a target program for semantic errors in the use of functions that control the dynamic resources utilized by the program such as malloc( )/free( ), new/delete, popen( )/pclose( ), XCreateWindow( )/XDestroyWindow( ) XmStringCreateLtoR( )/XmStringFree( ), Xtmalloc( )/Xtfree( ), new [ ]/delete[ ], open( )/close( ), or fopen( )/fclose( ). This is efficiently done by simulating the code with the use of a state table that interprets the operations of the target program based upon state information initially assigned to each variable and parameter operated upon by the target program. Depending upon the state type of the pointer assigned and the operation simulated, certain new states destinations are identified as errors in the state table, and thereby provide for the indication of coding violations.

In architecture, the present invention is implemented as a resource misuse analyzer configured in a computer memory as a set of executable instructions that identifies misuses of dynamic resources in a target program. The operations dictated by the resource misuse analyzer are implemented by a processor associated with a computer system in which the resource misuse analyzer resides. The resource misuse analyzer can operate in conjunction with a system compiler that processes the user code of a target program into an appropriate format for analysis, or alternatively, the resource misuse analyzer can itself incorporate a mini-compiler that generates the target program code in the appropriate format, independent of a compiler. The target programs are typically stored on a storage medium associated with the computer system upon which the present invention is operating. In addition, one or more work files are also located in the storage medium for storing summary information regarding each of the target programs that has been analyzed by the resource misuse analyzer for use when that target program is analyzed again or when other parts are analyzed. When implementing the present invention as a program on a generic computer system, the programmed computer system has specific functionality as a system tool that operates in the manner described herein below.

Specifically, the present invention can be thought of as a program comprising executable (i.e., computer-readable) instructions encoded on a memory device so as to cause a computer to generally function in the following manner. Initially, the code of the target program is prepared for analysis by parsing the code so as to generate intermediate code and then generating basic block structures representing the target program therefrom. Note that each basic block structure comprises a string of instructions with no branches into or out of the block with the exception of at the beginning and/or at the end of the block. In the preferred embodiment, the aforementioned steps are performed by a system compiler which passes the basic block structures on to the resource misuse analyzer. Upon receiving the basic block structures of the target program, the resource misuse analyzer translates the target program from intermediate code into a set of specific operations (also referred to as operators) designated for purposes of illustrating the preferred embodiment, and as will be discussed in greater detail below. Alternatively, the target program can be prepared for analysis by the resource misuse analyzer itself by integrating a minicompiler that is capable of generating the basic block structures of the target program.

The resource misuse analyzer translates the target program into a specific set of operations in order to simplify the analysis of the target program. By rewriting each instruction of the target program in terms of merely a few operations that are designed to capture specific information for performing the analysis, the number of actions or operations that must be analyzed can be dramatically reduced, and thus, the analysis simplified. In the case of the preferred embodiment where the use of dynamic memory is being analyzed, the operations utilized are concerned with the instructions that affect pointers. Therefore, any instruction that does not use a pointer will not generate an operation in the translation.

In regard to the translation, the resource misuse analyzer takes each basic block of intermediate code and rewrites the instructions with one or more operations such as assign, allocate, de-allocate, and dereference, as in the preferred embodiment. Note that some instructions are not translated because they do not affect the pointers of the target program, as discussed above.

The resource misuse analyzer then selectively calls one function of the target program at a time for analysis. Once a function has been analyzed, a summary of the operations for that function is stored as a function signature for that function. This function signature will then be used when analyzing any other function that calls this function. In addition, any coding violations found during analysis are reported.

The analysis performed by the resource misuse analyzer includes typing or marking each pointer associated with the variables and parameters of the function with new state information, such as UNKNOWN, CONSTANT, DYNAMIC, UNINITIALIZED, DUPLICATE, or INTERIOR. The pointers of each of these states have restricted uses as provided for by a state table such that particular operations are defined as causing an error (i.e., coding violation) when executed on a pointer with a specific state. Once the new states are initialized, a symbolic execution of the function is performed by simulating the operations with the new state information. The state table is utilized in the simulation to identify the occurrence of any errors in dynamic memory management from the execution of the function.

In accordance with a feature of the present invention, the coding violations located by the resource misuse analyzer can be reported with extreme accuracy, such as by identifying the specific line of code causing the error. Furthermore, the present invention can be operated in conjunction with an error browser so that error information can be provided to the user in an easy to use Graphic User interface.

In accordance with another feature of the present at mentioned, a single embodiment of a resource misuse analyzer in accordance with the present invention is capable of finding more than one type of dynamic resource misuse in a single execution.

In addition to the features set forth above, the resource misuse analyzer of the present invention has many advantages, a few of which are delineated hereafter as examples.

An advantage of the resource misuse analyzer of the present invention is that it can operate at compile-time, and therefore, can identify potential errors easier than the prior art techniques which operate at run-time.

Another advantage of the resource misuse analyzer of the present invention is that it can identify potential errors by inspection, and therefore, is able to check all the code of the target program.

Another advantage of the resource misuse analyzer of the present invention is that it does not require the program to be run, and therefore, the user is not required to create input data for testing of the target program.

Another advantage of the resource misuse analyzer of the present invention is that it can perform incremental analysis so that only functions which have changed since the last time the resource misuse analyzer was applied to a particular target program are checked for resource abuses. This is achieved by maintaining the appropriate information in the work file for reference by the resource misuse analyzer during execution.

Other features and advantages to the present invention will become apparent to one of ordinary skill in the art upon examination of the following drawings and detailed description. It is intended that all such additional features and advantages be included herein within the scope of the present invention, as is defined by the appended claims.

BRIEF DESCRIPTION OF THE DRAWINGS

The present invention can be better understood with reference to the following drawings. The elements of the drawings are not necessarily to scale, emphasis instead being placed upon clearly illustrating the principles of the present invention. Furthermore, like reference numerals designate corresponding parts throughout the several views.

FIG. 9 is a state table for interpreting intermediate code in accordance with the present invention.

DETAILED DESCRIPTION OF THE PREFERRED EMBODIMENT

The following description is of the best presently contemplated mode of carrying out the present invention. The resource misuse analysis system and method of the present invention has practical application in identifying numerous types of dynamic resource abuses such as using unitialized variables, not keeping a pointer (or other handle) for an allocated resource, deallocating a resource using a pointer (or other handle) that was not pointing to an allocated resource, deallocating a resource using a pointer (or other handle) that was a pointer to a resource of a compatible but different type, or having different paths to a spot in the code that allows a variable to point to two different kinds of resources. However, the particular application of the present invention as described hereinafter is directed to the use of the present invention for identifying coding violations resulting from errors in a program's dynamic memory allocation logic. Thus, the present description of the preferred embodiment is not to be taken in a limiting sense but is made merely for the purpose of describing the general principles of the invention. The scope of the invention should be determined by referencing the appended claims.

I. Architecture

A resource misuse analyzer in accordance with the present invention can be stored on any computer-readable medium for use by or in connection with a computer-related system or method. In the context of this document, a computer-readable medium is an electronic, magnetic, optical, or other physical device or means that can contain or store a computer program for use by or in connection with a computer related system or method.

Figure 1:
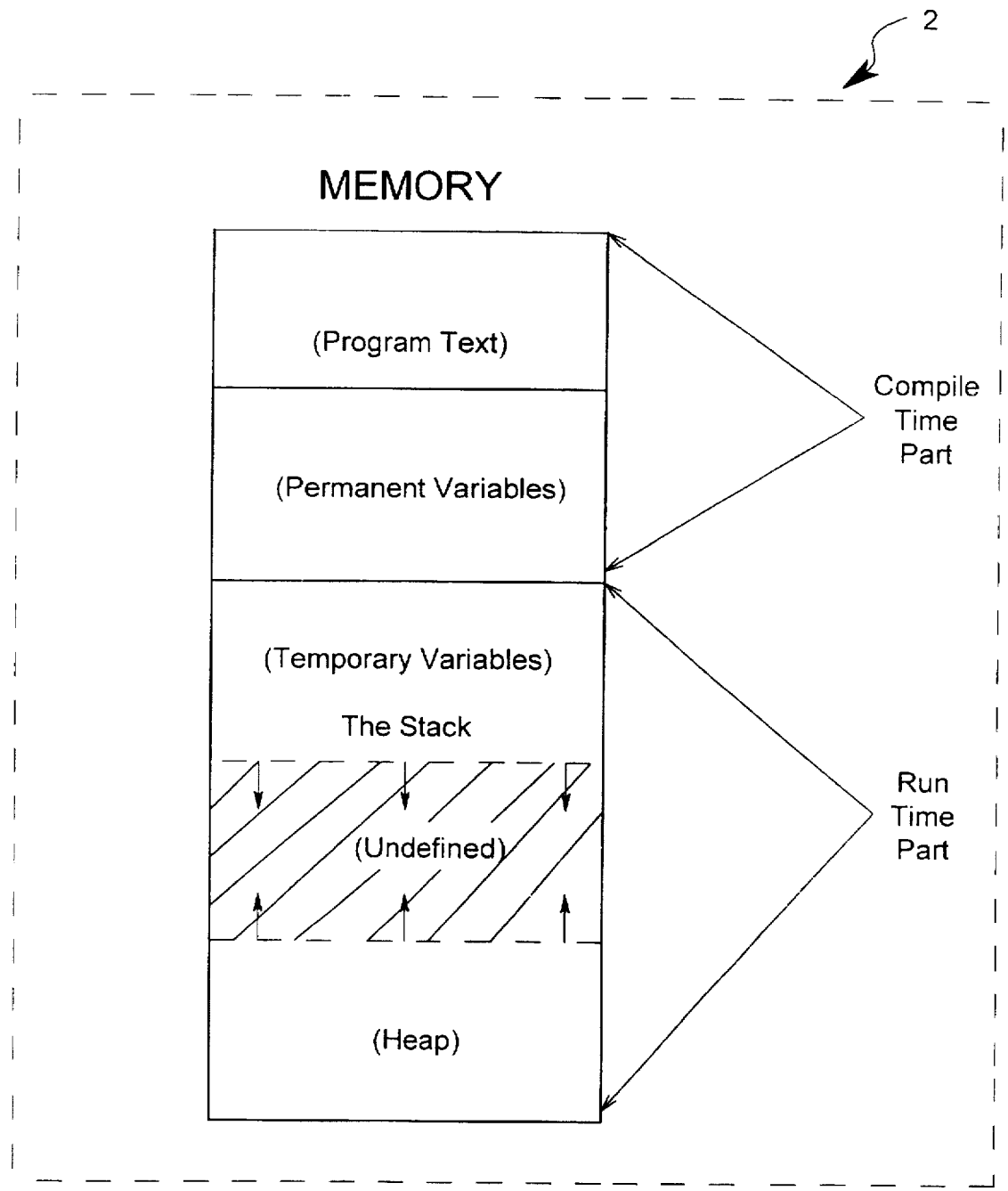
FIG. 1 is a conceptual diagram of a memory layout as commonly found in computers.
Figure 2:
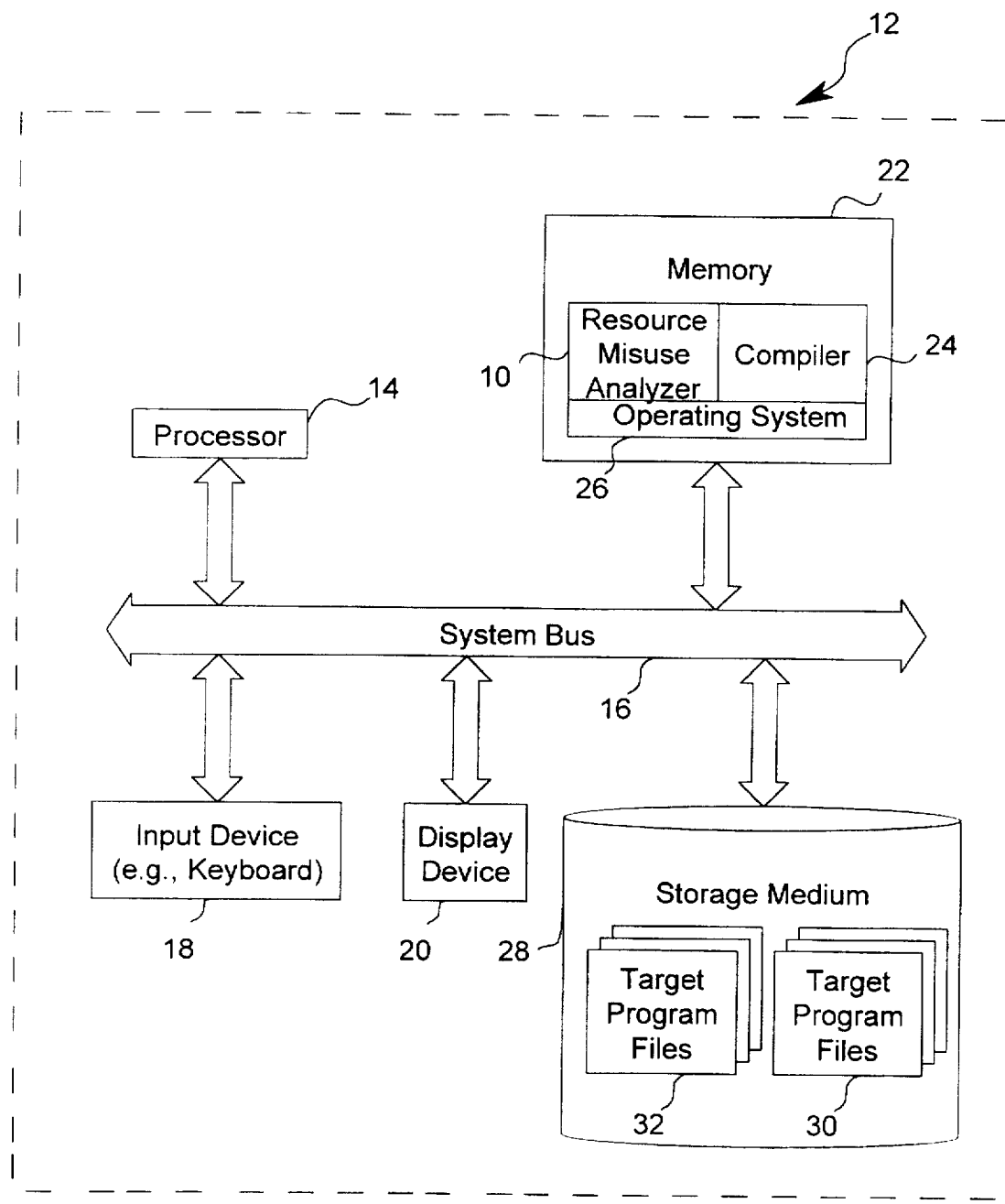
FIG. 2 is a block diagram illustrating the architecture and functionality of the resource misuse analyzer of the present invention situated within a computer-readable medium, for example, in the memory of a computer system.

FIG. 2 shows a block diagram of the computer hardware that includes an resource misuse analyzer 10 in accordance with the present invention. Shown in FIG. 2 is a computer system 12 that contains a processor 14. The processor 14 communicates with other elements within a computer system 12 via a system bus 16. An input device 18, for example, a keyboard or mouse, is used to input data from a user of the computer system 12, and a display device 20, for example, a monitor, is used to output data to the user. A memory 22 within the computer system 12 contains the resource misuse analyzer 10. In addition, a compiler 24 may also be stored in the memory 22 for operating in conjunction with the resource misuse analyzer 10 as is described in greater detail below. The resource misuse analyzer 10 communicates with a conventional operating system 26 to perform dynamic resource analysis on target programs.

A persistent storage medium 28 within the computer system 12 stores target program files 30 which are to be analyzed by the resource misuse analyzer 10. Also stored in the storage medium 28 are work files 32 which contain information about the target program files 30 including function signatures of analyzed functions, time stamp information of the files storing the functions, basic block structure of the function being analyzed and any work files needed by the compiler.

Figure 3:
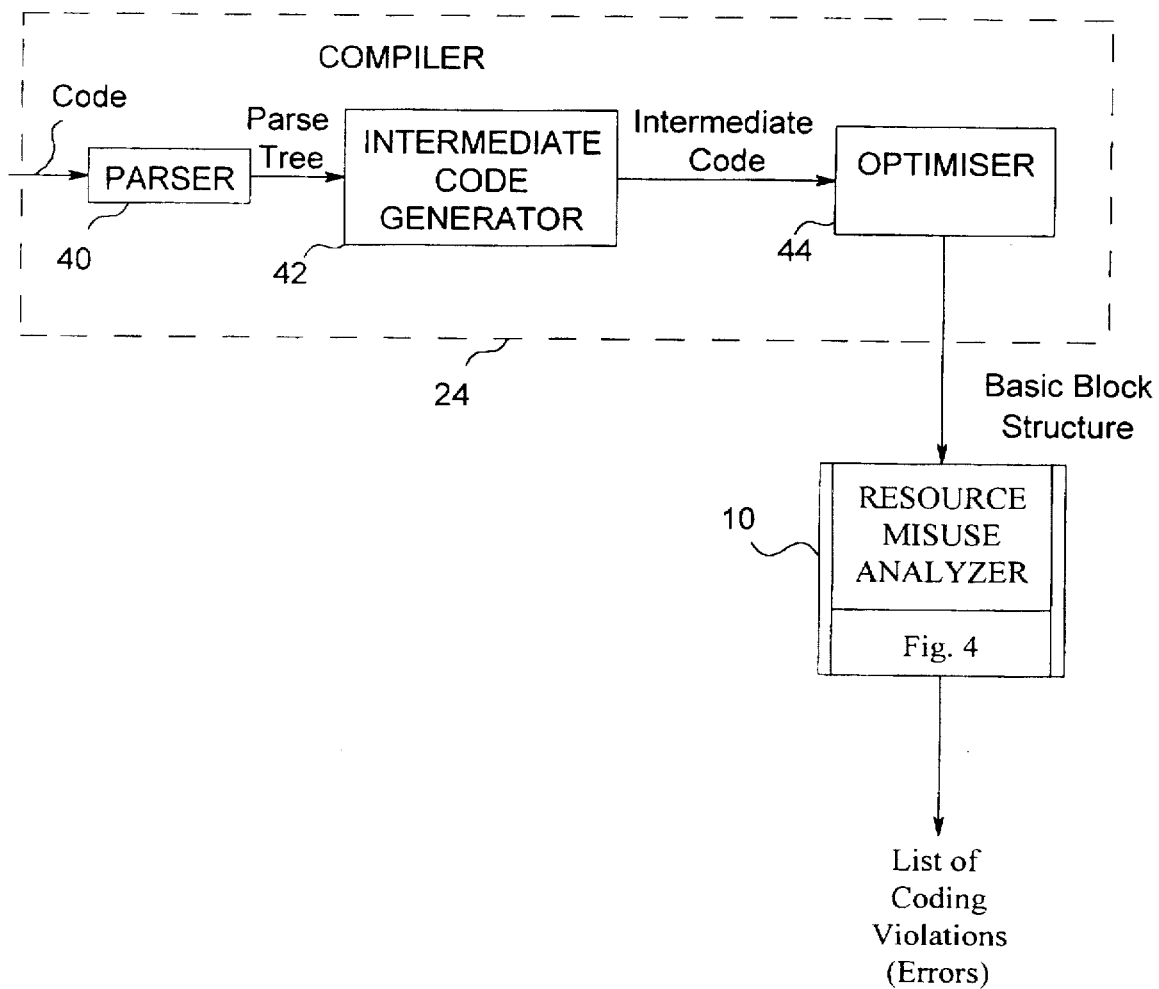
FIG. 3 is a block diagram illustrating an example of the code modules for implementing the resource misuse analyzer of FIG. 2.

With reference to FIG. 3, the relationship between the resource misuse analyzer 10 and the compiler 24 is illustrated. In essence, the compiler 24 performs several preliminary steps on the user code of the target program prior to the operation of the resource misuse analyzer 10. The compiler 24 retrieves the user code from the target program files 30 in the storage medium 28 and parses that code via parser 40. This results in a parse tree which is inputted into an intermediate code generator 42 which translates the parse tree into intermediate code. For example, in an HP-UX® compiler, this code is referred to as UCODE. The intermediate code is then inputted into an optimizer 44 which breaks up the intermediate code into basic blocks that comprise a basic block structure of target program. Note that the parser 40, intermediate code generator 42, and optimizer 44 are common to most commercially available compilers. A detailed description of the operation of parsers, intermediate code generators, optimisers, and basic block structures can be found, for instance, in Aho et al., "Compilers Principles, Techniques, and Tools", Addison-Wesley (1986).

Once the target program has been reduced to basic blocks of instructions, the resource misuse analyzer 10 can analyze one function of the program at a time by simulating the basic blocks in order to find any coding violations therein. By having the target program reduced to basic blocks, the analysis of the target program is made easier via symbolic execution, a well-known technique whereby the program is run without any data for the pointers associated with the variables and parameters of the function. Symbolic execution allows the states of the pointers for the parameters and variables to be monitored as described hereafter.

Figure 4:
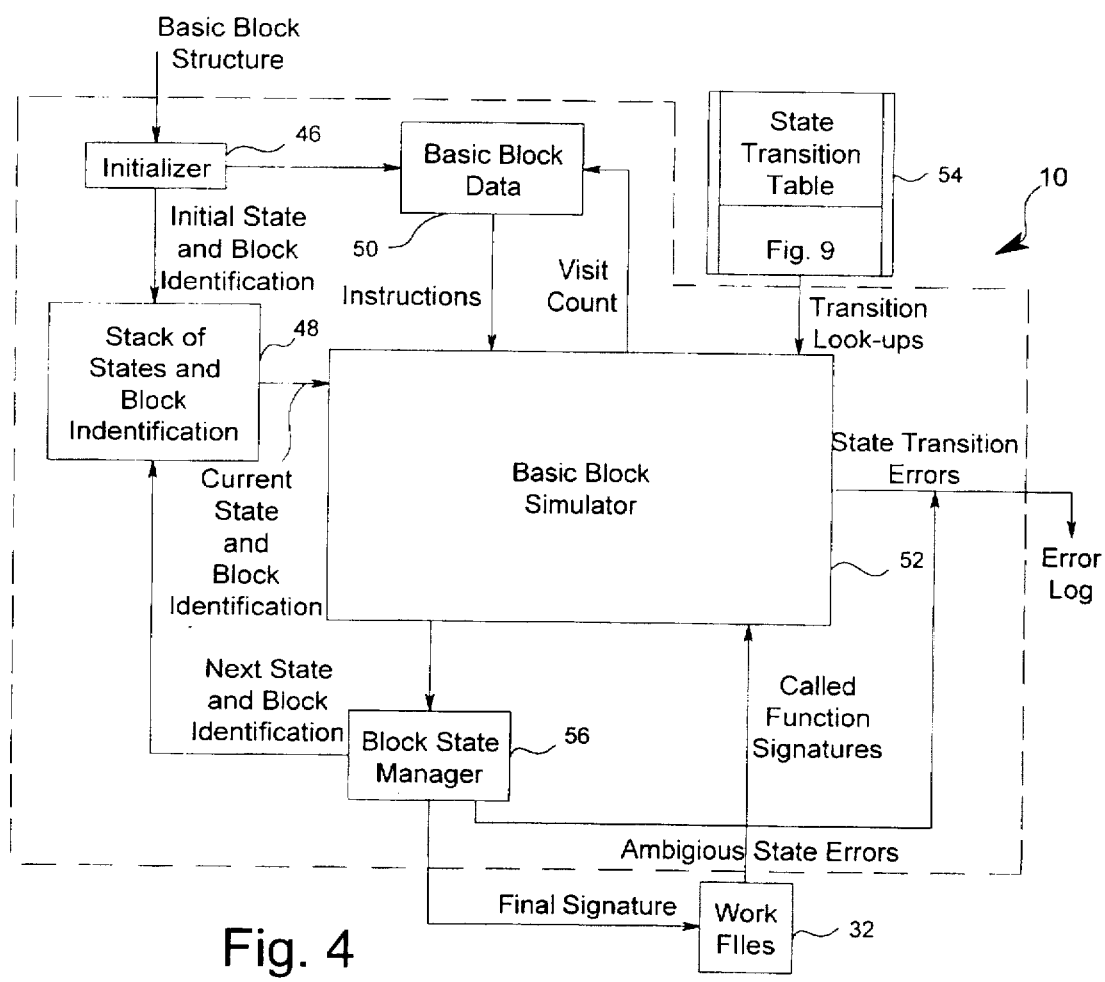
FIG. 4 is a block diagram of the resource misuse analyzer of FIG. 3.

In regard to the resource misuse analyzer 10, FIG. 4 provides a block diagram of the resource misuse analyzer 10 which includes an initializer 46 that receives each the basic block of a function from compiler 24 or some other basic block generator. The initializer creates an initial state vector and pushes the state vector on a stack 48 with the block identification of the first block of the function. The initializer further sends the basic block to the basic block data module 50 that provides the instructions of the basic block to a basic block simulator 52. The basic block simulator 52 receives the instructions from the basic block data module 50 and the current state vector and block identification from the stack 48 in order to simulate each basic block of the function, one at a time. The basic block simulator 52 further utilizes a State Transition Table 54 (described in detail below with reference to FIG. 9) for interpreting the intermediate code and the function signatures from the work files 32 of any function called in the block being simulated. When an illegal operation is performed at the basic block simulator 52, a state transition error is produced and sent to an error log. The final state of the block is sent to a block state manager 56 where the current state of the block is pushed back on the stack 48 with the block identification of any following blocks. For blocks that already have an initial state, the state is merged and any ambiguous state warnings are reported to an error log. If the current block is the final block, then the current state is used to compute the function signature of the function being analyzed which is then stored in a work file 32.

In accordance with a feature of the present invention, each instruction of the target program may be rewritten in terms of a few operators that capture enough information about the operations of the target program so that the resource misuse analyzer 10 can adequately check for coding violations during symbolic execution of the target program. Thus, preferably at the basic block simulator 52, each instruction of the intermediate code is interpreted into one or more operators. Note, however, most instructions of the target program will not use a pointer as an address to a variable or parameter, and therefore, will not need to be translated into an operator. For purposes of illustrating the present invention, the following operators are utilized: assign, allocate, de-allocate, and dereference. Each of these operators will be defined below in connection with the operation of resource misuse analyzer 10. Notwithstanding the above note that interpreting the program in terms of operators is not required for practicing the present invention, but desirable when the intermediate code includes a large number of instructions. Otherwise, if the intermediate code includes a small number of instructions, the State Transition Table 54 can be based on the particular instructions of the program rather than operators as described in the preferred embodiment.

As an alternative to compiler 24, a mini-compiler (not shown) can be incorporated into resource misuse analyzer 10 in order to perform substantially the same task of compiler 24 as described above. However, in this configuration, most of the compiler's parser would have to be written. Further, the usual compile errors and warnings can be omitted but all of the preprocessing, parsing, and symbol table maintenance are still needed. The main advantage of this configuration is that it is a more portable solution with no direct dependency on a particular compiler.

Figure 5:
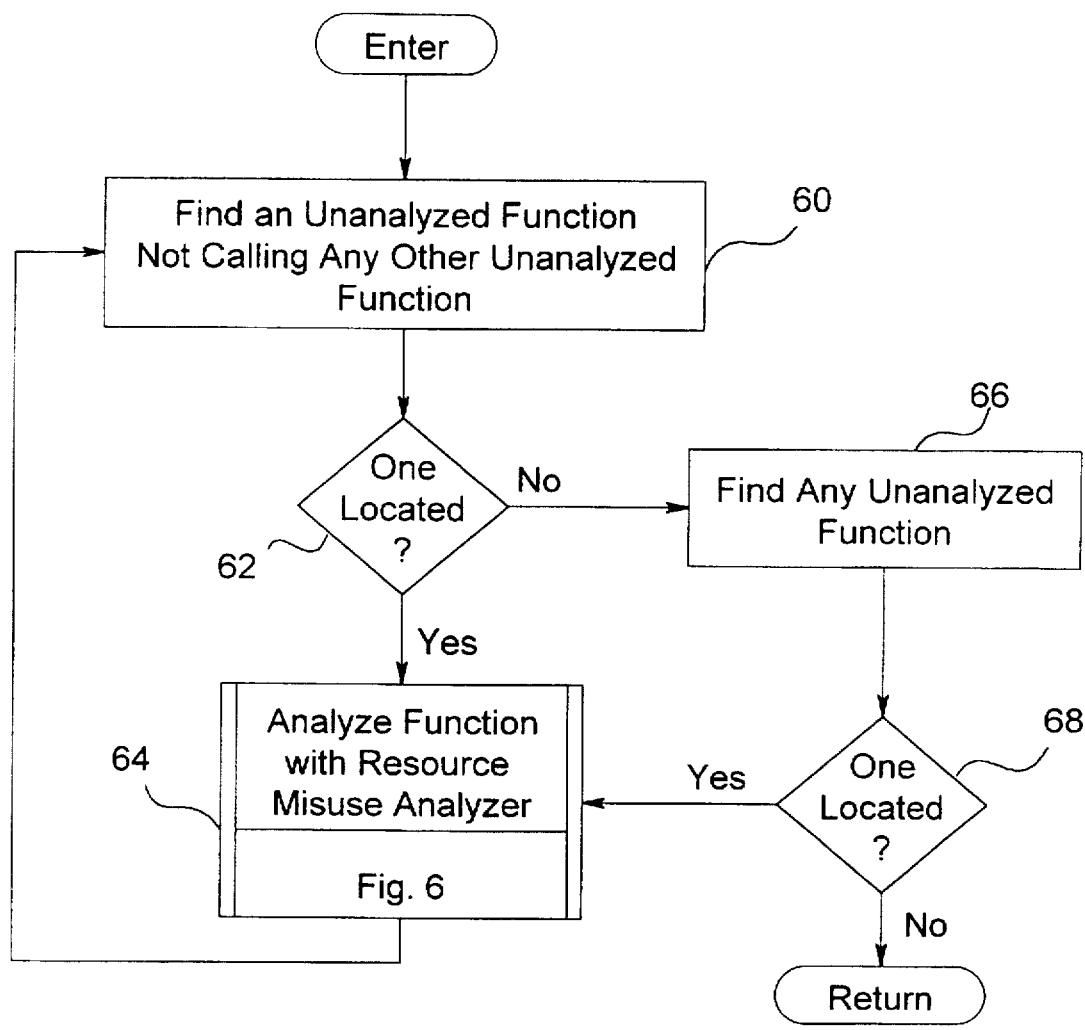
FIG. 5 is a flowchart of the operation of the resource misuse analyzer module of FIGS. 3 and 4.

A flowchart of a computer program for implementing the resource misuse analyzer 10 of the present invention is provided in FIG. 5. Similarly, features of the present invention as embodied in FIG. 5 are delineated in the flowcharts provided in FIGS. 6-8. It should be noted at this point that a flowchart illustrating the utility and functionality of a particular module is provided at the figure number within the box of that module.

II. Operation

The preferred operation and sequence of events corresponding with the resource misuse analyzer 10 of the present invention and the associated methodology are described hereafter.

In operation, a target program is first retrieved from one or more target program files 30 in storage medium 28 and then sent to the compiler 24 where the target program is translated into basic blocks. Refer to FIG. 3. The resource misuse analyzer receives the basic block structures and initially rewrites the code in terms of the operators allocate, de-allocate, assign, and dereference. Note, as previously stated, the code of the target program does not have to be rewritten (i.e., interpreted) into operators. Particularly, if the intermediate code does not include many instructions, the advantage of rewriting the intermediate code in order to simplify it for symbolic execution is most likely outweighed by the cost of the additional step of rewriting the code. The resource misuse analyzer 10 then analyzes the target program one function at a time in the manner described below.

With reference to FIG. 5, the resource misuse analyzer 10 initially searches for any unanalyzed function of the target program that does not call any other unanalyzed function, as indicated by block 60. If such a function is located, block 62 transfers to module 64 where the function is analyzed by the resource misuse analyzer 10. If an unanalyzed function that does not call another unanalyzed function cannot be located, block 62 transfers to block 66. At block 66, any unanalyzed function is located and selected for analysis. If no unanalyzed function is located at block 66, it is assumed at block 68 that all functions have been analyzed, thereby ending the execution of the resource misuse analyzer 10.

Upon completing the analysis of a function at module 64, the above process is repeated again starting at block 60 until all the functions of the target program have been analyzed.

In accordance with a feature of the present invention, the process illustrated in FIG. 5 advances in an incremental fashion so that the analysis can be performed on only those functions of the target program that have changed since the last execution of the resource misuse analyzer 10 on the current target program being analyzed. The information required for incremental operation of the resource misuse analyzer 10 is kept in the work file 32. Specifically, in the preferred embodiment, a function of the target program will be analyzed if (1) it has never been analyzed, (2) the file containing the function has been modified since it was last analyzed (the file containing the function could be the actual source file, the source file and all the files included by the file, the source file and the files including or included by the source files, or the source file and the files including or included by the source file with the compiler options which can change the behavior of the program), or a function called by this function has been reanalyzed and the signature of the called function changed as a result of being reanalyzed.

Figure 6:
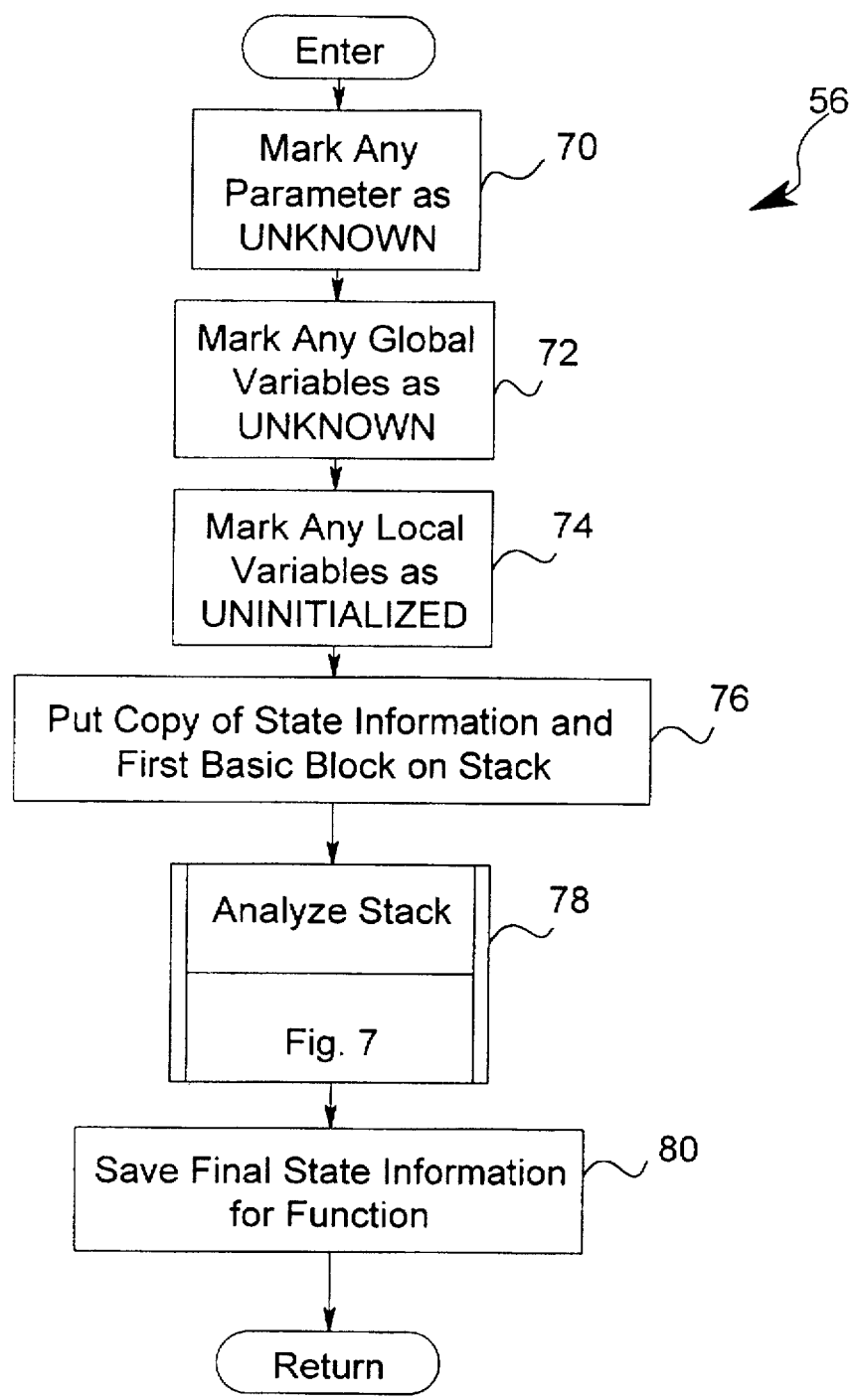
FIG. 6 is a flowchart of the operation of the analyze function module of FIG. 5.

With reference to FIG. 6, the analyze function of module 64 of FIG. 5 is illustrated. Once a function has been identified and called for analysis, each parameter and variable passed into the function is marked or assigned new state information upon which only certain operations are legal, that is, they do not cause an error. The states utilized may vary between implementations of the present invention though it is desirable that the number of states be limited in order to reduce complexity, and thereby, maintain the flexibility of the present invention. In the preferred embodiment, the pointers assigned to any parameters are marked as UNKNOWN by block 70, the pointers assigned to any global variables are marked as UNKNOWN by block 72, and the pointers assigned to any local variables are marked as UNINITIALIZED by block 74. By the operation of blocks 70, 72, and 74, all the parameters and variables of the function are defined by one of the aforementioned states for a lifetime, that is, until the pointer is re-assigned or freed by the program. In addition to the aforementioned states, additional possible states include CONSTANT, DYNAMIC, DUPLICATE, and INTERIOR. Following is a brief description of each of the aforementioned states utilized in the preferred embodiment of the present invention for identifying dynamic memory abuses.

The UNKNOWN pointer state is associated with variables that are actually in one of the other states, but the particular state is not known. In order to be conservative in generating error indications, it is assumed that anything the target program does with an UNKNOWN pointer type is legal. In addition, a parameter's pointer state will be assumed to be UNKNOWN when checking a function, as indicated by block 70.

If a pointer of a variable is passed by reference or value to a function that nothing is known about, no assumptions will be made about its state after the function call is made. The state of such a pointer will be set to UNKNOWN by the function call. If a variable with an UNKNOWN pointer state is passed to free( ), it will be assumed that it was a DYNAMIC pointer, described below, and upon returning from the call to free( ), it will be an UNINITIALIZED pointer as described below.

The UNINITIALIZED pointer state is associated with variables that are known to point to nothing that can be referenced. Any dereference of an UNINITIALIZED pointer generates an error message that cites the line of the dereference. Any assignment statement that makes a copy of an UNINITIALIZED pointer generates a warning message. A warning message is printed if an UNITIALIZED pointer is used as a return value of a function. As indicated in block 74, for purposes of illustrating the present invention, all local variables are initially an UNINITIALIZED pointer. Once an UNKNOWN or DYNAMIC pointer variable is passed to free( ), or a function known to call free( ) on its parameter, it becomes an UNINITIALIZED pointer. A variable with an UNINITIALIZED pointer state can only change type by re-assignment.

The CONSTANT pointer state is associated with variables that are known to point to a non-heap part of memory. This might be a pointer to a static variable, a global variable, or a literal. Any function to call free( ) with a CONSTANT pointer is an error. All non-pointer variables can be considered CONSTANTs.

The DYNAMIC pointer state is associated with variables that are known to point to an allocated resource. The DYNAMIC variables need a data field associated with each instance so that it is known what type of resource that was allocated. In C programming language, the type of resource will usually be "malloc( )," while C++ programming language will use "new( )" and "new[ ]" type of memory resources. When special libraries are linked to a program they may define other types of memory for example in X11 many return pointers freed with XFree( ). There are also pointers that need to XFreeColors( ) or XFreeFont( ). In addition, Xt supports both XtMalloc( ) and XtFree( ), and Motif libraries supports XmStrings, all of which need to be freed in their own way. These represent three more kinds of memory resources. To be as flexible as possible, any implementation of the present invention should include some way for the DYNAMIC pointers to be created on the fly as data about new libraries is loaded, as could be easily implemented by one of ordinary skill in the art given the teachings of the present invention provided herein.

Besides memory resources, other kinds of resources can be tracked with a variable having a DYNAMIC state. For instance, calling fopen( ) returns a FILE pointer. If the FILE pointer goes out of scope without closing it, the FILE resource is lost. Calling popen( ) also returns a FILE pointer, but closing it with fclose( ) is an error that will leave a zombie process on a UNIX system. In addition, it is a resource leak, and an error is reported, when the last copy of a generic pointer variable goes out of scope. It is also an error if a DYNAMIC pointer variable is freed with the wrong type of function. As an example, something allocated with new( ) cannot be freed with either free( ) or delete[ ]. It must be freed with delete( ) or an error occurs.

One control the user may want to have over the error messages generated by any of the illegal operations described herein is to allow some mixing of memory resources without incurring an error. For example, memory allocated in Xlib should be freed using XFree( ). However, everything works suitably well if it is freed using free( ) or XtFree( ). Mixing these three memory resources is not a problem with some operating systems such as HP-UX, and it may be desirable for the user to allow such action.

Further, a DYNAMIC variable state and all its copies and offsets become an UNINITIALIZED pointer type when the DYNAMIC variable, or any of its copies, is freed.

The DUPLICATE pointer state is associated with variables that are known to be a copy of variables of a DYNAMIC or UNKNOWN pointer. Copies made of CONSTANT and UNINITIALIZED variables are considered to be CONSTANT and UNINITIALIZED, respectively. The copy of a DUPLICATE becomes simply another DUPLICATE of the original DYNAMIC or UNKNOWN pointer. A copy of an INTERIOR pointer (described below) becomes just another INTERIOR pointer of the original DYNAMIC or UNKNOWN variable. A DUPLICATE variable not only has a state associated with it, it has the name and the variable of which it is a copy. A DUPLICATE variable becomes an UNINITIALIZED pointer when the original, or any of its copies is freed. If the original variable should go out of scope, or be assigned a new value, one of the copies is considered to be the original, and all the other copies refer to this copy as their original.

The INTERIOR pointer state is associated with variables that are known to be the result of an integer being added to a variable of DYNAMIC pointer or UNKNOWN pointer. It is an error to free an INTERIOR variable. An INTERIOR variable not only has a state associated with, it has the name of the variable it was computed from. An INTERIOR variable becomes an UNINITIALIZED pointer when its associated pointer is freed. If the original variable should go out of scope, or be assigned a new value, one of the copies is considered to be the original, and all INTERIOR pointers refer to this copy as their original. If there are no copies, then a memory leak error is reported, and the state of the INTERIOR pointers are set to UNKNOWN to suppress related errors.

Referring back to FIG. 6, once all the parameters and variables have been marked with one of the above states, block 76 puts (or pushes) a copy of the current state information (i.e., state vector) for the parameters and variables and the first basic block onto a stack for analysis. Next, module 78 analyzes the stack. This is a recursive operation beginning with the first basic block and then working through the function, one block at a time (and some blocks more than once), exploring all the pathways through the function. Once all the paths have been explored, the final state information in the record is saved and stored in work file 32 by block 80.

Figure 7:
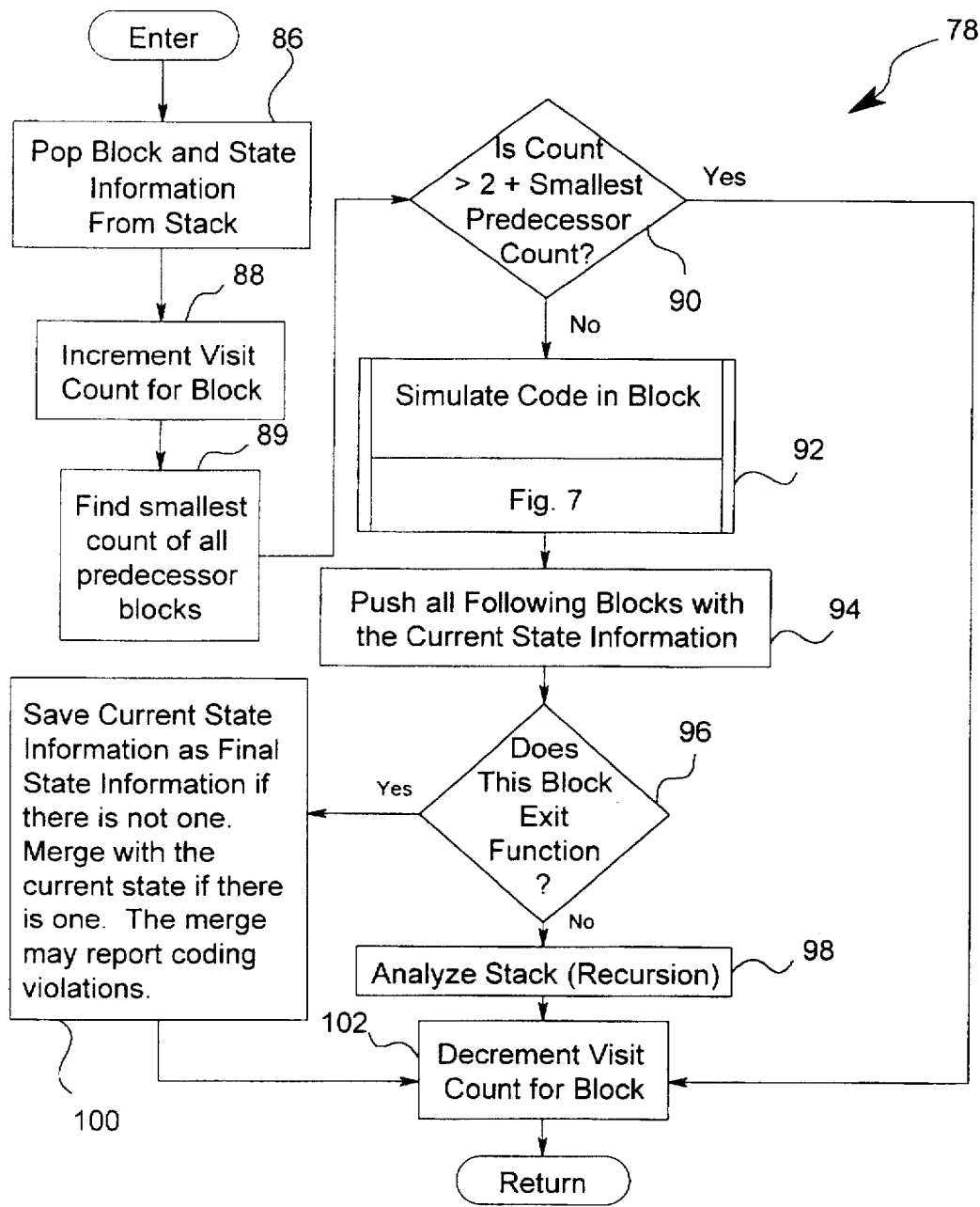
FIG. 7 is a flowchart of the operation of the analyze stack module of FIG. 6.

With reference now to FIG. 7, the stack analysis performed by module 78 begins by popping the basic block and state information from the stack by block 86 and incrementing a visit count for that particular basic block by block 88. In order to prevent from being caught in a loop during symbolic execution, block 89 finds the smallest visit count of all predecessor blocks so as to ensure that a block is not visited more than twice in a loop. Block 90 then determines if the visit count for that particular basic block is greater than the smallest predecessor count plus two (2). If the visit count is not greater than the smallest predecessor visit count plus two (2), then block 90 transfers to module 92 where the code of the block is simulated as described in detail with reference to FIG. 8. Block 94 then pushes all the following basic blocks on the stack with the current stack information. If the current block does not exit the function, then block 96 transfers to block 98 where the stack continues to be analyzed in a recursive fashion.

If the current block does exit the program, then block 96 transfers to block 100 where the current state information is saved as the final state information if there is not yet one, but if there is one, it is merged with the current state information.

This merge may result in coding violations attached. For instance, if the final state information for a function is different depending, on which of two or more possible paths through the function are executed, then the function will have an ambiguous signature. In this case, the signature of the function will include UNKNOWN as the resulting state of a variable or it can store the union (merger) of all possible states, as discussed below. Thus, the ambiguous signature will result in impaired checking of functions that call this function. The ambiguous signature may be the result of a coding error, but it may also happen to perfectly valid code. Accordingly, in the preferred embodiment, a warning message is issued for an ambiguous state error though it may be desirable at times to suppress such coding violation errors. Once the stack has been analyzed at block 98, or the current basic block exits the program at block 100, then block 102 decrements the visit count for the current basic block.

In addition, referring back to block 90, if the visit count for the current basic block is greater than the smallest count of the predecessor blocks plus two (2), then block 90 transfers to block 102 where the visit count is decremented for that block. The visit count is provided to prevent simulation from going through a loop more than twice.

Figure 8:
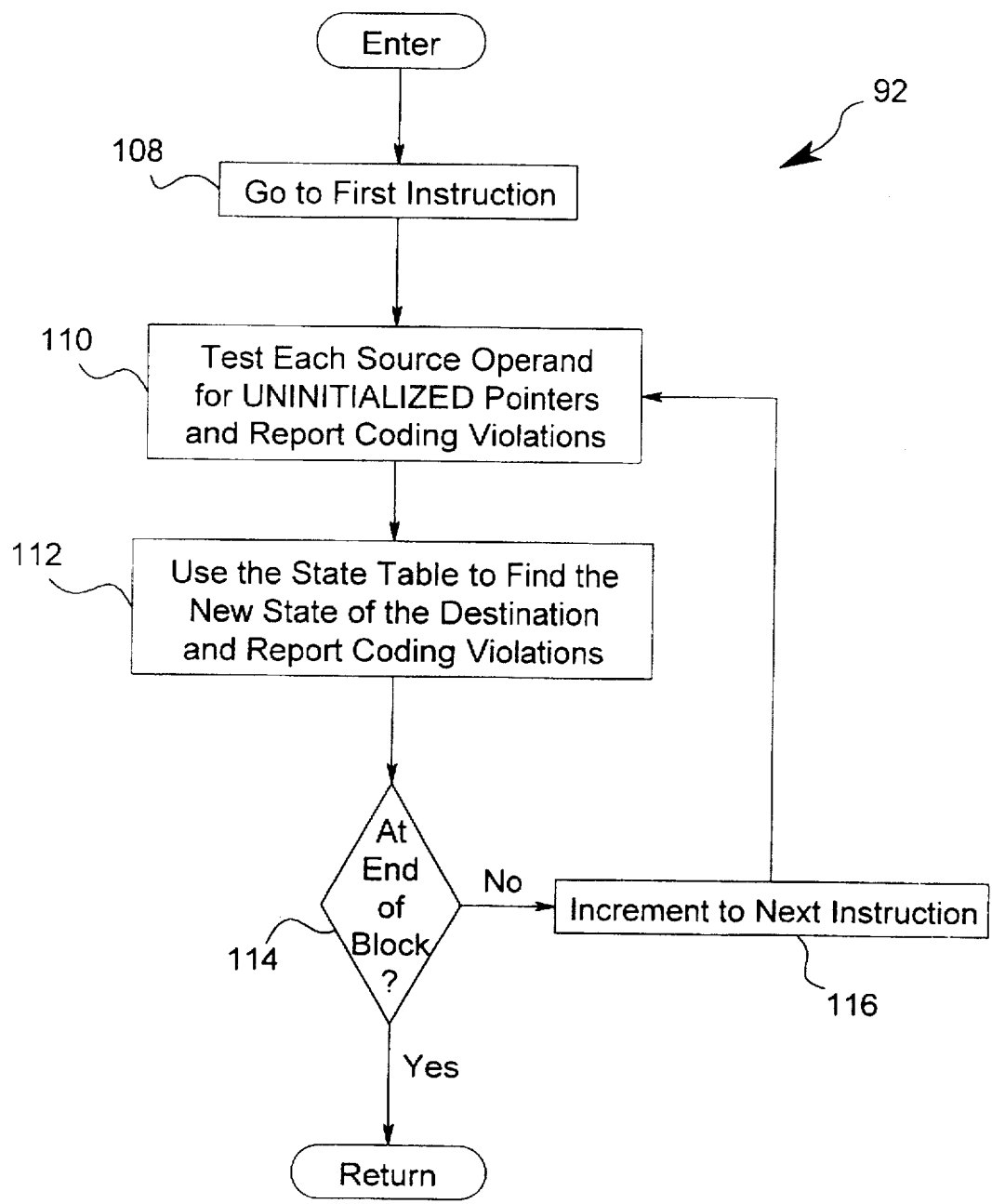
FIG. 8 is a flowchart of the operation of the code simulation module of FIG. 7.

With reference now to FIG. 8, the operation of block 92 of FIG. 7 begins with module 108 that goes to the first instruction of the current basic block and then transfers to block 110 which initially checks each source operand for UNINITIALIZED variables and parameters and reports any found as coding violations. Block 110 then transfers to block 112 which uses the State Transition Table for Interpreting Intermediate Code, such as that provided in FIG. 9, (referred to hereafter as "State Transition Table") to track the state information of the parameter and variables as the instructions of the basic block are simulated. As will be obvious to one of ordinary skill in the art, the functionality of the State Transition Table may alternative be implemented by a subroutine of the resource misuse analyzer 10. The State Transition Table provides the new state of each pointer when an operation (i.e., instruction) is executed on it so as to identify any errors resulting from illegal operations. Note that the block 112 utilizes the State Transition Table to look at the outcome (destination) of an operation for errors whereas block 110 looks at the input operand for errors. If block 114 determines that all the instructions of a basic block have been analyzed, the simulation of that basic block ends. Alternatively, if block 114 determines that additional instructions remain to be simulated, then block 114 transfers to block 116 which increments to the next instruction. Block 116 then transfers to back block 110 where the operations of blocks 110 and 112 are repeated. This process continues in a repetitive fashion until all the instructions of the current block have been simulated.

Accordingly, integral to the operation to the present invention is the State Transition Table which provides for the interpretation of the code comprising the basic block using the operators assign, allocate, de-allocate, copy, and dereference. As discussed hereinbefore in the preferred embodiment, the instructions that comprise the basic block structures are rewritten in terms of these operators in order to simplify the symbolic execution of the target program. Thus, all of the instructions of the target program are implemented via none, one, or more than one of the stated operators. When an assign operation takes place, the life of the old value stored in the variable ends. In addition, resource leaks are checked for at this time and an error is reported if a dynamic pointer variable with no copies has a new value assigned to it. Like assign, when an allocate operation takes place, it ends the lifetime of the old variable stored in the variable and resource leaks are checked for at this time. Further, in response to an allocate operation, the state of the variable becomes DYNAMIC and the resource type is noted. A de-allocate operation is the operator for representing free( ). The de-allocate operation is verified that the variable is in a DYNAMIC pointer of the right type, an UNKNOWN pointer, or a DUPLICATE pointer of one of these types. The state of the variable is changed to an UNINITIALIZED pointer state as are all the DUPLICATE pointers and INTERIOR pointers. A dereference operation simply means that the variable was used to access what it points to. With a deference operation, the state of the variable does not change but each dereference is a time to check that the variable is not in an UNINITIALIZED state.

It is worth noting again at this point that if the intermediate code is not complex, that is, it includes few instructions, the code need not be rewritten. In this case, the State Transition Table would track state information based on the current state and the executed instruction rather than the current state and executed operator as with the preferred embodiment.

It is further worth noting that the process of exploring the different paths through the function becomes complicated when branches and loops are encountered. When a branch is encountered, it is preferred that both branches be simulated. This is done by saving the state of all the variables and parameters, simulating the operators on the "then" branch, restoring the state of the variables and parameters, and then simulating the operators on the "else" branch. At the point where the branches merge, the two resulting states for the variables and parameters are compared. If they are the same, there is no problem. However, if they are different, several choices are available. First, it is known that many types of states can coexist in one variable. If one branch gives a state of a CONSTANT pointer type, and another branch gives a state of a INTERIOR pointer type, then a new state of an INTERIOR\CONSTANT pointer type can be made. As long as future uses of the variables and parameters are consistent with both CONSTANT and INTERIOR states, then no error is reported. Secondly, it is noted that other states cannot coexist in one variable. If one branch gives a state type of an UNINITIALIZED pointer type, and another branch gives a state of a DYNAMIC pointer type, then a warning is reported. The allocated memory from one branch must be freed, but if the garbage from the other branch is ever freed, it will corrupt the memory heap. In this case, a warning about the variable is outputted and the UNKNOWN pointer state is used.

Looping is a special case of branching. The fact that branching exists means that it is impossible to look at all paths through a function. It is important that some of the paths involving loops are covered. The three most important are skipping the loop altogether (zero times through the loop), going through the loop once, and going through the loop twice. Going through a loop more than two times will only generate warnings if a warning was generated on the second pass through the loop. The visit count kept for each block of the function enforces this by making sure that a given block is not visited more than two times more often than any of its predecessor blocks. Another method would involve computing the exit signatures for each block and then recomputing them each time any of their input signatures changed, and repeating this until the signatures converge In addition, as variables go out of scope, an UNINITIALIZED pointer state is assigned, or some new type, so that any memory leak errors will be caught.

Once a function has been interpreted via its operations, the operations of the function are summarized in order to generate a signature for that particular function. This signature will be used when checking functions that call the present function. The goal is to only include operators that have an effect that is visible to a calling function. For instance, operations on local variables are generally not important, only the first deference operation or de-allocation operation of a variable is useful, and only the last allocation operation of a variable is useful. Accordingly, the signature will comprise no more than two operations per affected parameter or variable.

In concluding the detailed description, it should be noted that it will be obvious to those skilled in the art that many variations and modifications may be made to the preferred embodiment without substantially departing from the principles of the present invention. All such variations and modifications are intended to be included herein within the scope of the present invention, as set forth in the following claims. Further, any claims hereafter, the corresponding structures, materials, acts, an equivalence of all means or step plus function elements are intended to included any structures, material, or acts for performing the function in combination with other claimed elements as specifically claimed.

Wherefore, the following is claimed:

1. A computerized method for analyzing a computer program for resource misuses wherein said program includes one or more functions, comprising the steps of:
   generating a basic block structure of said program;
   defining a state associated with each variable and parameter in each said function of said program;
   providing state transition means for identifying illegal operations associated with each of said states so as to identify resource misuses resulting from coding violations;
   analyzing said program by performing symbolic execution of each of said functions utilizing said basic block structure and said state transition means;
   checking for said coding violations resulting from execution of said illegal operations during said symbolic execution of a function; and
   reporting said coding violations as errors.

2. The method of claim 1, wherein the step of generating said basic block structure of said program includes the step of generating intermediate code of said program.

3. The method of claim 1, further including the step of creating a signature for each of said functions of said program.

4. The method of claim 3, further comprising the step of utilizing said signature associated with a first function when analyzing a second function that calls said first function.

5. The method of claim 1, further comprising the step of interpreting said program into operators for simplifying said symbolic execution of said program.

6. The method of claim 1, wherein said states include unknown, constant, dynamic, uninitialized, duplicate and interior.

7. The method of claim 1, wherein the step of analyzing said function includes checking for improper operations performed on one of said variables.

8. The method of claim 1, wherein the step of analyzing said function includes maintaining a visit count for each basic block of said basic block structure so as to prevent from being caught in a loop during symbolic execution of one of said program.

9. The method of claim 1, wherein the step of analyzing said function includes maintaining a record of said states during symbolic execution.

10. The method of claim 1, wherein the step of performing symbolic execution includes simulating each basic block of said function in a specific order defined by possible pathways through said function.

11. The method of claim 1, further including the step of updating a work file with relevant information regarding said program for use in a subsequent resource misuse analysis of said program.

12. The method of claim 1, further including the step of creating a state vector to define said state.

13. A computerized system for resource misuse analysis of a computer program, comprising:
   a resource misuse analyzer for defining a state associated with each parameter and variable in each function of said program, and for performing symbolic execution of each said function in order to check for coding violations in said functions by identifying illegal operations of said program based upon said states;
   state transition means for identifying said coding violation given said pointer states and operations performed by said program.

14. The system of claim 12, further comprising:
   a processor;
   a storage medium;
   a memory; and
   a work file for storing a signature for each said function of said program;
   wherein said resource misuse analyzer is disposed in said memory and said work file is stored in said storage medium.

15. The system of claim 13, further including translation means for rewriting said program into operators that simplify symbolic execution of said program.

16. The system of claim 13, wherein said resource misuse analyzer includes a basic block simulator, a block state manager, and a stack.

17. The system of claim 13, wherein said pointer states include unknown, constant, dynamic, uninitialized, duplicate and interior.

18. The system of claim 13, further including checking means for checking for improper operations on one of said variables given said state of said variable.

19. The system of claim 13, wherein said resource misuse analyzer includes stack means for performing symbolic execution utilizing said states.

20. The system of claim 13, wherein said resource misuse analyzer is further configured to create a state vector to define said state.

21. A computer-readable storage medium having a checking program for analyzing resource abuse of a target computer program prior to run-time, said checking program comprising:

a translation mechanism for generating operators from code that define said target computer program and that perform operations in said program; and an analyzer mechanism for defining a state for each parameter and variable of a function of said target computer program, and for performing symbolic execution of said function to check for coding violations in said function by noting erroneous operations in said function; and a signature mechanism for creating a signature for said function from said coding violation identified by said analyzer mechanism.

* * * * *